United States Patent [19]

Cheng et al.

[11] 4,451,625

[45] May 29, 1984

[54] REDUCTION OF WALL FOULING IN THE SUSPENSION POLYMERIZATION OF VINYL CHLORIDE HOMOPOLYMER

[75] Inventors: John T. C. Cheng; Michael Langsam, both of Allentown, Pa.

[73] Assignee: Air Products and Chemicals, Inc., Allentown, Pa.

[21] Appl. No.: 405,638

[22] Filed: Aug. 5, 1982

[51] Int. Cl.$^3$ ................................................ C08F 2/20
[52] U.S. Cl. ........................................ 526/62; 526/200; 526/201
[58] Field of Search ........................................... 526/62

[56] References Cited

U.S. PATENT DOCUMENTS

| | | | |
|---|---|---|---|
| 3,778,423 | 12/1973 | Retter | 260/92.8 |
| 4,024,301 | 5/1977 | Witenhafer et al. | 427/230 |
| 4,038,473 | 7/1977 | Cohen | 526/62 |
| 4,048,417 | 9/1977 | Noël | 526/62 |
| 4,076,951 | 2/1978 | Katayama et al. | 526/62 |
| 4,081,248 | 3/1978 | Cohen | 23/285 |
| 4,098,972 | 7/1978 | Ogawa et al. | 526/62 |
| 4,173,696 | 11/1979 | Koyanagi | 526/62 |
| 4,224,424 | 9/1980 | Bauman | 526/62 |
| 4,256,864 | 3/1981 | Cohen | 526/62 |
| 4,359,560 | 11/1982 | Bauman | 526/74 |

*Primary Examiner*—C. A. Henderson
*Attorney, Agent, or Firm*—Michael Leach; E. Eugene Innis; James C. Simmons

[57] ABSTRACT

This invention relates to a method for reducing the amount of wall fouling in the suspension polymerization of vinyl chloride. The surfaces of the polymerization reactor are wetted with a solution containing from 5 to 50 wt % alkali metal hydroxide, 0.01 to 1 wt % free radical inhibitor and 0.01 to 1 wt % surface active agent prior to charging the vinyl chloride polymerization recipe to the reactor. Preferably, the surface of the wetted reactor is heated to a temperature from 40° to 100° C. for at least 5 minutes prior to charging the polymerization recipe.

9 Claims, No Drawings

REDUCTION OF WALL FOULING IN THE SUSPENSION POLYMERIZATION OF VINYL CHLORIDE HOMOPOLYMER

TECHNICAL FIELD

This invention relates to a method for reducing the wall fouling normally occurring in stainless steel reactors used for the suspension polymerization of vinyl chloride containing monomer systems.

BACKGROUND OF THE INVENTION

Polymer buildup, or wall fouling, in reactors used for the suspension polymerization of vinyl chloride systems has been a problem. Several obvious advantages would be achieved by reducing wall fouling. First, productivity of the reactors could be increased in that the reactors would not have to be taken out of service as often for cleaning. Second, there would be less product contamination due to particulate material dropping from the reactor surface into the product.

Some of the techniques used in reducing the polymer deposit in the polymerization of vinyl chloride are described in the following patents:

U.S. Pat. No. 3,778,423 discloses a method for substantially reducing the adhesion of vinyl chloride polymer to the interior surface of the polymerization vessel by coating the surface, prior to polymerization, with a free radical inhibitor. The example discloses coating a glass-lined reactor with alpha-methylstyrene.

U.S. Pat. No. 4,024,301 discloses the application to the inner surfaces of a reaction vessel of a coating composition containing, as a primary ingredient, a straight chain or branched polyaromatic amine dissolved in an aqueous alkali metal hydroxide solution.

U.S. Pat. No. 4,038,473 discloses that polymer buildup is substantially reduced if before the polymerization the reactor is first mechanically cleaned to remove visible polymer deposits and then cleaned of organic materials adsorbed on the metal surfaces; and thereafter between polymerization charges as required, by treatment with a hot solution containing an alkali metal compound and a surface active agent to remove organic residues from the metal surfaces.

U.S. Pat. No. 4,076,951 discloses a method for preventing the deposition of polymer scales on the inside surface of the polymerization vessel by coating the interior surface of the vessel prior to the polymerization with at least one compound selected from the group consisting of hydroxyhydroquinone and pyrogallol.

U.S. Pat. No. 4,081,248 discloses a method for substantially eliminating polymer buildup on the inner surfaces of the reaction vessel by applying an aqueous alkali metal hydroxide coating solution containing a straight chain or branched polyaromatic amine and a dispersant operable in aqueous media, such as, for example, polyvinyl alcohol.

U.S. Pat. No. 4,098,972 discloses a method for reducing the deposition of polymer scale on the vessel walls in the bulk polymerization of vinyl chloride monomers. The inner walls of the vessel are coated with one or more specifically selected inorganic or organic compounds having a solubility greater than 0.5 g in 100 g of water at 25° C. and a boiling point higher than 60° C.

U.S. Pat. No. 4,224,424 discloses a method for reducing the amount of wall fouling in the suspension polymerization of vinyl chloride in stainless steel reactors. The reactor surfaces are wetted with a solution containing an alkali metal carbonate or alkali metal bicarbonate, or both, prior to charging the vinyl chloride recipe to the reactor. In some cases it may be preferable to add a small amount of a conventional wetting agent, such as quaternary ammonium aryl halides. Preferably, the surface of the reactor, after wetting, is heated to a temperature of about 40° to 100° C. prior to charging the recipe.

U.S. Pat. No. 4,256,864 discloses a method for reducing polymer buildup on the inner surfaces of a polymerization reaction vessel by applying a particular coating to the inner surfaces. The coating results from applying an aqueous solution of a hydrophilic polymer-inhibitor complex such as, for example, a complex of polyvinyl alcohol and the disodium salt of bisphenol A.

SUMMARY OF THE INVENTION

This invention relates to a method for reducing reactor wall fouling in the suspension polymerization of a recipe comprising vinyl chloride monomer, water, a suspension agent and a free radical initiator. The method for reducing wall fouling in stainless steel reactors comprises wetting the internal reactor surfaces, including turbine blades and shafts, baffles and cooling coils with a solution comprising (a) 5 to 50 wt % alkali metal hydroxide,
(b) 0.01 to 1 wt % free radical inhibitor, and
(c) 0.01 to 1 wt % surface active agent, prior to charging the recipe to the reactor. In a preferred embodiment, the reactor surface is contacted with the anti-wall fouling solution and the reactor surfaces heated to a temperature from about 40° to 100° C. for at least 5 minutes prior to charging the polymerization recipe.

Although many of the prior art systems reduced wall fouling, the treatment methods are often difficult to perform and the treating compositions quite expensive. In many instances the results, even though the methods were utilized, were marginal.

Several advantages can be achieved by this process:

A treatment method which is capable of reducing vinyl chloride polymer deposition in stainless steel reactors to a level at least, if not better than many of the reported commercially used processes; a mechanism for reducing polymer deposition utilizing a solution which is relatively non-corrosive to commercial equipment and, in addition, relatively easy to handle; the productivity of the reactors is increased in that the reactors do not have to be taken out of service as often for cleaning; and, the quality of polymer products is increased by reducing contamination with wall polymers.

DETAILED DESCRIPTION OF THE INVENTION

The present invention is based on the discovery that an alkali metal hydroxide solution containing a free radical inhibitor and a surface active, or wetting, agent when applied to the internal surface of a stainless steel reactor can effectively reduce the amount of polymer deposition normally associated with the suspension polymerization of vinyl chloride. Surprisingly, application of such caustic anti-fouling compositions to the internals of a reactor used for the copolymerization of vinyl chloride and vinyl acetate does not result in a significant reduction in polymer deposition.

Representative alkali metal hydroxides which are effective are the Group I metals and include sodium hydroxide, potassium hydroxide, lithium hydroxide, and the like.

The alkali metal hydroxide is included in the treating solution in a concentration from about 5 to 50 wt %, preferably between about 15 to 30 wt %. The latter range is particularly effective for sodium and potassium hydroxide. When the concentration of alkali metal hydroxide is reduced generally below about 5 wt %, there is often insufficient caustic or alkali metal hydroxide deposited on the internal reactor surfaces to substantially inhibit polymer deposition on the reactor surface. On the other hand, as the proportion of alkali metal hydroxide exceeds about 50 wt %, the advantages obtained are not commensurate with the additional cost associated with the higher concentration of alkali metal hydroxide. Further, it becomes difficult to handle the solution under commercial manufacturing conditions. For reasons of economy and efficiency, it appears that a solution containing about 15 to 30 wt % alkali metal hydroxide, preferably sodium hydroxide, should be used to coat or wet the internal surfaces of the reactor.

Any solvent in which the alkali metal hydroxide is substantially inert and soluble or dispersible therein can be utilized in practicing this invention. These solvents include lower alkanols having from 1 to 4 carbon atoms, lower alkyl esters, for example, butyl acetate and ethyl acetate, amides such as dimethylformamide and water. However, in most situations the solvents that can be used are severely limited. Some, although effective for reducing polymer deposition, may cause polymer degradation or discoloration. Dimethylformamide is an example. For these reasons, it is necessary to determine the effect that any residual solvent may have on the finished polymer in terms of degradation or discoloration.

As mentioned, the solvent should be substantially inert to the alkali metal hydroxide so that it does not substantially reduce the basicity of the solution. Therefore, the preferred solvent for use in treating the interior reactor surfaces is water. It provides desirable results without affecting product quality or effecting polymer degradation or polymer discoloration. Of the lower alkanols, methanol and ethanol are preferred although these solvents are not as desirable as water.

The anti-wall fouling solutions of the invention also contain free radical inhibitors which are a well known class of compounds. Inhibitors normally cause an induction period in a free radical initiated polymerization when added directly to the reaction mixture. Suitable free radical inhibitors for addition to the solutions of the invention include those inhibitors disclosed in U.S. Pat. No. 3,778,423 and U.S. Pat. No. 4,256,864 which are incorporated by reference. The preferred inhibitors are phenolic type compounds including, for example, butylated hydroxytoluene (BHT), bisphenol A and bisphenol B. The free radical inhibitors are added to the solution in amounts ranging from 0.01 to 1 wt %, preferably 0.1 to 0.5 wt %.

When the anti-wall fouling composition comprises an alkali metal hydroxide in water, certain of the free radical inhibitors may not be sufficiently soluble in the caustic solution for purposes of the invention. Such inhibitors would include amines such as, for example, diphenylamine, triphenylamine and triethylamine. On the other hand, inhibitors such as thioalcohols and phenol and its derivatives would have enhanced solubility, therefore, the preference for bisphenol A and BHT.

The third component of the anti-wall fouling composition is a conventional surface active, or wetting, agent. The surface active agents used in conjunction with the alkali metal hydroxide and inhibitors may be any of a great variety of materials. Anionic, nonionic and cationic surface active agents may be employed, although cationic surfactants may present solubility problems in the caustic solution. Anionic surface active agents include a great variety of types including sodium or potassium salts of disproportionated rosin acid soap such as sodium dihydroabietate, fatty acid soaps such as sodium stearate and potassium oleate, alkali soaps of naphthenic acid, alkyl sodium sulfosuccinates such as diamyl, dihexyl and dioctyl, sodium alkyl sulfates such as sodium lauryl sulfate, sulfated fatty acid amides and esters, sodium sulfates of acid esters such as lauric and oleic, sodium salts of sulfonated oils, alkylaryl sulfonates such as sodium alkyl naphthalene sulfinate and sodium alkyl benzene sulfonates, sodium benzoyl naphthalene sulfonate, isobutyl naphthalene sodium sulfonate, sodium naphthalene sulfonic acid condensate and the like.

Non-ionic surface active agents include poly(alkoxy) non-ionics, and particularly polyethers such as poly(oxyethylene) sorbitol laurate, poly(oxyethylene) stearates, poly(oxyethylene) esters of mixed fatty and rosin acids, fatty alcohol ethylene oxide condensates, glycerol monostearate, sorbatan esters of fatty acids, diethylene glycol stearate and the like. Preferred are the alkylphenoxy polyethoxy ethanols, such as, for example, octyl or nonylphenoxy polyethoxy ethanol.

Cationic surface active agents include quaternary ammonium salts such as cetyl dimethylbenzyl ammonium chloride, amine cationic surface active agents such as the monooleate of triethanolamine, primary fatty amines such as stearyl amine, tertiary amine polyoxyethylene condensates such as polyoxyethylene coco amine and quaternary amines as dicocodimethyl ammonium chloride.

The wetting agents are present in the anti-fouling composition in a range from 0.01 to 1 wt %, preferably 0.1 to 0.5 wt %.

In order to reduce the wall fouling, the caustic-inhibitor-wetting agent solution is applied to the internal reactor surface, including agitator blades, agitator shaft, baffles, and other elements in sufficient amount to wet the interior surfaces prior to charging the polymerization recipe. The application of the treating solution can be conducted in many ways, but the simplest and fastest is to spray the solution directly onto the reactor surfaces. In addition, it normally results in the use of less material. Alternatively, the reactor can be charged with the treating solution and stirred by means of the reactor agitator and then drained. After the internal reactor surfaces have been contacted with the anti-fouling solution, the excess solution is drained from the reactor. In a broad sense the reactor then is ready to be charged with the vinyl chloride polymerization recipe.

Although the wetting of the internal surface of the stainless steel reactor with the anti-fouling treating solution can result in reduced polymer deposition in the suspension polymerization of vinyl chloride, it has been found that superior results are obtained if the solution is "baked" onto the surface of the reactor prior to charging the polymer reaction mixture. Baking of the solution onto the reactor surface is accomplished by heating the reactor to a temperature from 40° to 100° C., preferably from 60° to 80° C., for at least 5 minutes, preferably for about 10 to 30 minutes. Longer baking cycles, i.e. those longer than 30 minutes, are not required and do not seem to result in any significant advantages. However, baking cycles of 10 hours may be used without adverse effect. It is possible to heat the reaction surface simultaneously with the spraying of the solution onto the reactor surface and to terminate heating after spraying. The better plan is to heat for a few minutes after spraying.

The anti-fouling treatment is most effective in those conventional vinyl chloride recipe polymerizations where the initial pH of the polymerization is at or above 6.0 and preferably above 7.8. When the initial pH falls below about 7.0, the recipe acidity may neutralize a substantial portion of the residual alkali metal hydroxide at the reactor surface and reduce its ability to contribute to the reduction in reactor fouling.

With respect to initial pH, this means that the pH of the system itself is above 6.0, and preferably 7.0 to 7.8. Much of the basicity will come from the alkali metal hydroxide remaining in the reactor rather than because of alkaline materials being present in the system. This pH limitation is intended to avoid vinyl chloride recipes which incorporate acids or acidic buffers, for example, phosphoric acid or phosphates to reduce the pH to a value below about 6.0 and even as low as 4.5. In those cases the buffers react with the alkali metal hydroxide and reduce the overall effectiveness of the caustic-inhibitor-wetting agent solution.

The vinyl chloride recipes which are suspension polymerized to form a homopolymer generally contain water in an amount to provide from about 35 to 65% solids, from about 0.05 to 1.5% suspending agent, for example, carboxymethyl cellulose, hydroxyethyl cellulose, and from about 0.01 to 0.5% of a monomer soluble polymerization initiator, for example, azo bisvaleronitrile, t-butyl peroxyneodecanoate, t-butyl peroxypivalate, lauryl peroxide, and the like.

The following examples are intended to illustrate preferred embodiments of the invention and are not intended to restrict the scope thereof.

EXAMPLES 1-8

Because of the difficulty in obtaining reproducability of data in suspension polymerization processes, particularly with respect to reducing wall fouling in the reactor, several laboratory runs were made with identical polymer recipes in the same reactor. The results were evaluated based on the grams of polymer retained, exclusive of loose material, in the reactor after a set number of batches had been conducted. The evaluation was made after several runs as it was known that the rate of polymer deposition increases with increasing polymer deposit on the reactor walls. After each set of runs the reactor was thoroughly cleaned by hand to remove substantially all traces of polymer deposits.

The laboratory reactor used in the evaluation was a Chemco MDX-GJ model 1.5 liter 316 stainless steel reactor manufactured by Chemical Equipment Corporation of Tulsa, Okla.

The homopolymer and copolymer recipes polymerized in the reactor were as follows:

| HOMOPOLYMER | |
|---|---|
| Water | 560 g |
| Hydroxypropylmethyl cellulose | 0.4 g |
| Sodium bicarbonate | 0.18 g |
| Vinyl chloride | 400 g |
| t-Butyl peroxyneodecanoate[a] | 0.35 ml |
| Temperature of polymerization = 58° C. | |
| Polymerization time = 5 hours | |
| COPOLYMER | |
| Water | 600 g |
| Polyvinyl pyrrolidone | 0.45 g |
| Sodium bicarbonate | 0.72 g |
| Vinyl chloride | 332 g |
| t-Butyl peroxypivalate[b] | 0.31 ml |
| Azo bis-valeronitrile[c] | 0.18 g |
| Vinyl acetate | 68 g |
| Trichloroethylene | 1.3 ml |
| Temperature of polymerization = 71° C. | |
| Polymerization time = 3 hours | |

[a]Esperox 33M t-butyl peroxyneodecanoate marketed by Witco Chemical Corp.
[b]Lupersol 11 t-butyl peroxypivalate marketed by Lucidol Division of Pennwalt Corp.
[c]Vazo 64 azo bis-valeronitrile marketed by E. I. DuPont de Nemours & Co.

CHARGE PROCEDURES

The suspending agent was pre-dissolved as a 1.0% aqueous solution. Sodium bicarbonate and the suspending agent solution were added to the water and then charged to the reactor under nitrogen purge. The other components (chain transfer agent, monomers and initiator) were charged rapidly. The reactor contents were quickly heated to the polymerization temperature under constant agitation of about 500 rpm. The polymerizations were carried to about 85% conversion. At the end of the polymerization, the reactor contents were quickly cooled to ambient, vented to atmosphere pressure, filtered, dried and tested.

ANTI-FOULING TREATMENT PROCEDURE

The anti-fouling solutions were prepared by dissolving sodium hydroxide in aqueous solution followed by the addition of the inhibitor, wetting agent and other components under constant agitation at ambient temperature.

The clean, dried reactor (wall and agitator) was coated with the anti-fouling solution by brushing on uniformly followed by drying in an oven at the specified temperature and time, normally at 60° C. for 15 to 30 minutes. After being removed from the oven, the reactor was cooled and ready for charge. The reactor can also be coated by immersion or spray-on techniques.

The number of batches carried out in the reactor and the fouling, i.e., the total grams of material deposited on the reactor surfaces exclusive of loose material was recorded and are shown in the table.

TABLE 1

| | | GRAMS POLYMER BUILD-UP (# ACCUMULATED BATCHES) | |
|---|---|---|---|
| RUN | ANTIFOULING SOLUTION | HOMOPOLYMER SYSTEM | COPOLYMER SYSTEM |
| 1 | None | 29.6 (3) | 48.6 (3) |
| 2 | 25% NaOH | 4.6 (3) | 7.8 (3) |
| 3 | 25% NaOH 0.1% Vinol 540[a] 0.5% butylated hydroxytoluene | 6.1 (3) | 10.0 (3) |
| 4 | 25% NaOH 0.1% Vinol 540 0.5% Bisphenol A 0.2% Triton X-100[b] | 3.2 (3) | 6.7 (3) |
| 5 | 25% NaOH 0.1% Natrosol 250 MBR[c] 0.5% Bisphenol A | 3.3 (3) | |

TABLE 1-continued

| RUN | ANTIFOULING SOLUTION | GRAMS POLYMER BUILD-UP (# ACCUMULATED BATCHES) | |
|---|---|---|---|
| | | HOMOPOLYMER SYSTEM | COPOLYMER SYSTEM |
| 6 | 0.1% Triton X-100 25% NaOH 0.25% Bisphenol A | 1.3 (3) | |
| 7 | 0.2% Triton X-100 25% NaOH 0.5% Bisphenol A | 1.0 (3) | 43.7 (3) |
| 8 | 0.2% Triton X-100 25% NaOH 1.0% Bisphenol A .2% Triton X-100 | 2.1 (3) | |

*a*Polyvinyl alcohol marketed by Air Products and Chemicals, Inc.
*b*Octylphenoxy polyethoxy ethanol marketed by Rohm and Haas Co.
*c*Hydroxyethyl cellulose marketed by Hercules Corporation.

From the data in the table it can be seen that by simply using a sodium hydroxide treating solution the polymer buildup in the vinyl chloride homopolymer system and the vinyl chloride-vinyl acetate copolymer system was reduced to about one-sixth the level which resulted when no anti-fouling solution was applied to the internals of the reactor.

When a hydrophilic polymer-inhibitor complex (polyvinyl alcohol—BHT), as taught by U.S. Pat. No. 4,256,864, was used in the caustic solution in Run 3 the polymer deposition increased by more than 25% in both the homopolymer and copolymer systems compared to Run 2. The addition of the wetting agent to the caustic solution containing the hydrophilic polymer-inhibitor complex (polyvinyl alcohol-bisphenol A) in Run 4 resulted in a greater reduction in polymer buildup than in Run 3 which utilized a anti-fouling solution containing a polymer-inhibitor complex without a wetting agent. In fact, Run 4 showed a greater reduction in polymer buildup than the sodium hydroxide solution treatment of Run 2. Run 5 was a repeat of Run 4 except that the hydrophilic polymer was hydroxyethyl cellulose in place of polyvinyl alcohol. With regard to the vinyl chloride homopolymer system Run 5 gave a reduction in polymer buildup comparable to that of Run 4.

Most unexpectedly, however, Runs 6, 7 and 8 which utilized a sodium hydroxide solution containing an inhibitor (bisphenol A) and a wetting agent but not containing a hydrophilic polymer demonstrated superior results with respect to the vinyl chloride homopolymer system. These runs showed a polymer buildup significantly less than that of Runs 4 and 5 which contained a hydrophilic polymer-inhibitor complex and wetting agent.

Of perhaps the greatest surprise was the fact that the caustic-inhibitor-wetting agent anti-fouling solution used in Run 7 afforded the smallest buildup of polymer at a level of about 1 gram for three accumulated batches while the same anti-fouling solution when used to pretreat the reactor for the vinyl chloride-vinyl acetate copolymer system resulted in a large polymer buildup of about 43.7 g comparable to that resulting when no anti-fouling solution was applied to the internals of the reactor.

Therefore, it is quite evident that the data presented in the table demonstrates the surprising and superior reduction in polymer buildup achieved using an alkali metal hydroxide-inhibitor-wetting agent solution to pretreat a reactor for the polymerization of vinyl chloride homopolymer.

STATEMENT OF INDUSTRIAL APPLICATION

The invention provides a method for improving the productivity of vinyl chloride polymerization reactors and lessening product contamination from particulates breaking loose from polymer deposits by reducing the polymer buildup on the internal surfaces of the reactor.

We claim:

1. In a suspension polymerization process wherein vinyl chloride monomer, water, a suspension agent and a monomer soluble polymerization catalyst is charged in stainless steel reactor at an initial pH above 6.0 and subsequently polymerized at an elevated temperature to produce a vinyl chloride homopolymer, the method for reducing wall fouling in the stainless steel reactor which comprises wetting the internal reactor surfaces with a solution consisting essentially of a solvent and
   (a) 5 to 50 wt % alkali metal hydroxide,
   (b) 0.01 to 1 wt % free radical inhibitor, and
   (c) 0.01 to 1 wt % surface active agent.

2. The invention of claim 1 which includes the step of heating the wet reactor surface to a temperature from about 40° to 100° C. for a period of at least 5 minutes prior to charging the polymerization components to the reactor.

3. The invention of claims 1 or 2 wherein the alkali metal hydroxide is selected from the group consisting of sodium hydroxide, potassium hydroxide and lithium hydroxide.

4. The invention of claims 1 or 2 wherein the free radical inhibitor is a phenolic type compound.

5. The invention of claim 4 wherein the phenolic type inhibitor is selected from the group consisting of butylated hydroxytoluene and bisphenol A.

6. The invention of claims 1 or 2 wherein the surface active agent is a non-ionic polyethoxylated compound.

7. The invention of claim 6 wherein the surface active agent is an alkylphenoxy polyethoxy ethanol.

8. The method of claim 2 in which the solution comprises 15–30 wt % alkali metal hydroxide.

9. The method of claim 2 in which the solvent is water.

* * * * *